United States Patent
Petzold

(10) Patent No.: US 10,447,048 B2
(45) Date of Patent: Oct. 15, 2019

(54) METHOD FOR FORMING A TRANSPORT SAFETY SYSTEM AND BATTERY-OPERATED ELECTRICAL DEVICE

(71) Applicant: Vorwerk & Co. Interholding GmbH, Wuppertal (DE)

(72) Inventor: Stefan Petzold, Solingen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 43 days.

(21) Appl. No.: 14/446,518

(22) PCT Filed: Jan. 15, 2013

(86) PCT No.: PCT/EP2013/050631
§ 371 (c)(1),
(2) Date: Jul. 30, 2014

(87) PCT Pub. No.: WO2013/113546
PCT Pub. Date: Aug. 8, 2013

(65) Prior Publication Data
US 2015/0280470 A1 Oct. 1, 2015

(30) Foreign Application Priority Data
Feb. 2, 2012 (DE) .................. 10 2012 100 866

(51) Int. Cl.
*H02J 7/00* (2006.01)
(52) U.S. Cl.
CPC .......... *H02J 7/0031* (2013.01); *H02J 7/0042* (2013.01); *H02J 7/0052* (2013.01); *H02J 7/0063* (2013.01);
(Continued)

(58) Field of Classification Search
CPC ...... H02J 7/0031; H02J 7/0052; H02J 7/0063; H02J 7/0042; H02J 7/0026
(Continued)

(56) References Cited

U.S. PATENT DOCUMENTS 4,068,568 A * 1/1978 Moss ...................... A62C 99/00
169/61
5,251,179 A * 10/1993 Wittman ................ G11C 5/141
307/66

(Continued)

FOREIGN PATENT DOCUMENTS

| EP | 2 309 616 A2 | 4/2011 |
| JP | 2008-283786 A | 11/2008 |
| WO | 2007/121533 A1 | 11/2007 |

OTHER PUBLICATIONS

Japanese Office Action in JP 2014-555137 dated Nov. 2, 2016 with English translation of relevant parts.
(Continued)

*Primary Examiner* — David V Henze-Gongola
*Assistant Examiner* — Tarikh Kanem Rankine
(74) *Attorney, Agent, or Firm* — Collard & Roe, P.C.

(57) ABSTRACT

An electrical device having a transport safety system that prevents unwanted discharge of the battery during transport. The electrical device has a battery connected to the electrical device, a charging device configured to be connected to the electrical device or to the battery, and an electrical discharge protection circuit associated with the battery or the electrical device to prevent discharge of the battery during transport. The electrical discharge protection circuit is adapted to be activated when connected to the charging device by engaging a button actuation on the electrical device, and is adapted to be deactivated by charging the battery. The discharge protection circuit is configured so that a wanted or unwanted actuation of the button when the discharge protection circuit (Continued)

is activated does not lead to activation of electrical components of the electrical device.

6 Claims, 7 Drawing Sheets

(52) U.S. Cl.
CPC ........... *H02J 7/0026* (2013.01); *H02J 7/0032* (2013.01); *H02J 7/0077* (2013.01); *H02J 7/0088* (2013.01); *H02J 7/0091* (2013.01)

(58) Field of Classification Search
USPC ........................................................ 320/107
See application file for complete search history.

(56) References Cited

U.S. PATENT DOCUMENTS

| | | | | |
|---|---|---|---|---|
| 5,757,595 | A * | 5/1998 | Ozawa | B60L 11/1818 320/104 |
| 6,072,250 | A * | 6/2000 | Thandiwe | H02J 7/0011 307/150 |
| 6,144,186 | A * | 11/2000 | Thandiwe | H01M 10/4257 320/134 |
| 6,204,573 | B1 * | 3/2001 | Green | H02J 7/0031 307/64 |
| 6,271,605 | B1 | 8/2001 | Carkner et al. | |
| 6,433,442 | B1 * | 8/2002 | Mackel | B60R 16/03 307/10.1 |
| 6,545,447 | B1 * | 4/2003 | Smith | H01M 10/44 320/132 |
| 6,927,555 | B2 * | 8/2005 | Johnson | H02J 7/0063 320/134 |
| 7,671,560 | B2 * | 3/2010 | Croman | H02J 7/0075 320/112 |
| 8,593,110 | B2 * | 11/2013 | Cassidy | H01M 10/441 320/116 |
| 2005/0189907 | A1 * | 9/2005 | Kim | B26B 19/3873 320/107 |
| 2006/0192527 | A1 * | 8/2006 | Kageler | B25F 5/00 320/115 |
| 2009/0047619 | A1 * | 2/2009 | Oh | A61C 5/50 433/32 |
| 2009/0189548 | A1 * | 7/2009 | Hoffman | H01M 10/44 315/307 |
| 2009/0261737 | A1 * | 10/2009 | Wright | F21L 4/027 315/154 |
| 2009/0295233 | A1 * | 12/2009 | McGinley | H02J 9/005 307/126 |
| 2010/0097035 | A1 * | 4/2010 | Buchholz | H02J 7/0031 320/134 |
| 2010/0109765 | A1 * | 5/2010 | Esnard | H02J 9/005 327/544 |
| 2010/0194348 | A1 * | 8/2010 | Wang | H01M 10/48 320/136 |
| 2011/0006736 | A1 | 1/2011 | Robinson et al. | |
| 2011/0159469 | A1 * | 6/2011 | Hwang | A61B 5/222 434/247 |
| 2013/0009858 | A1 * | 1/2013 | Lacey | G06F 1/1643 345/156 |
| 2016/0190842 | A1 * | 6/2016 | Hatsumi | B60Q 9/00 340/455 |

OTHER PUBLICATIONS

English translation of relevant parts of the Notification of the Reasons for Rejection.
International Search Report of PCT/EP2013/050631, dated Apr. 29, 2013.

* cited by examiner

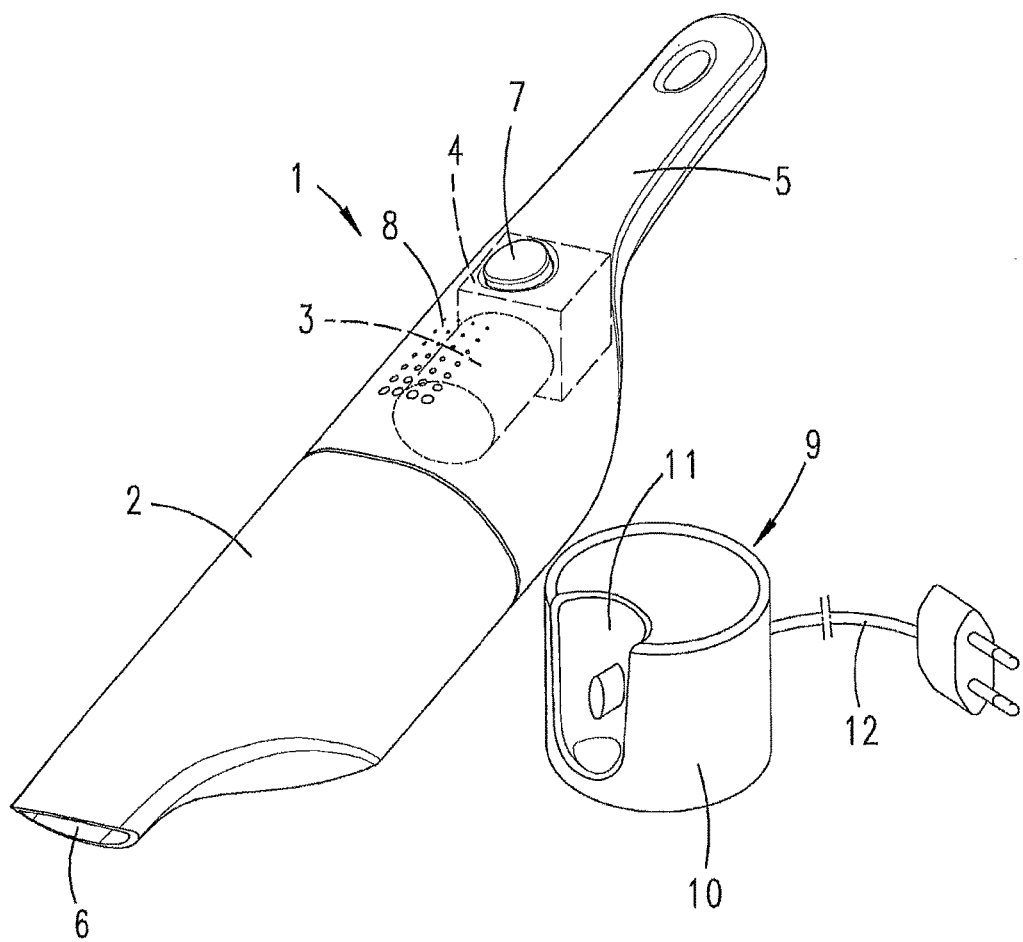

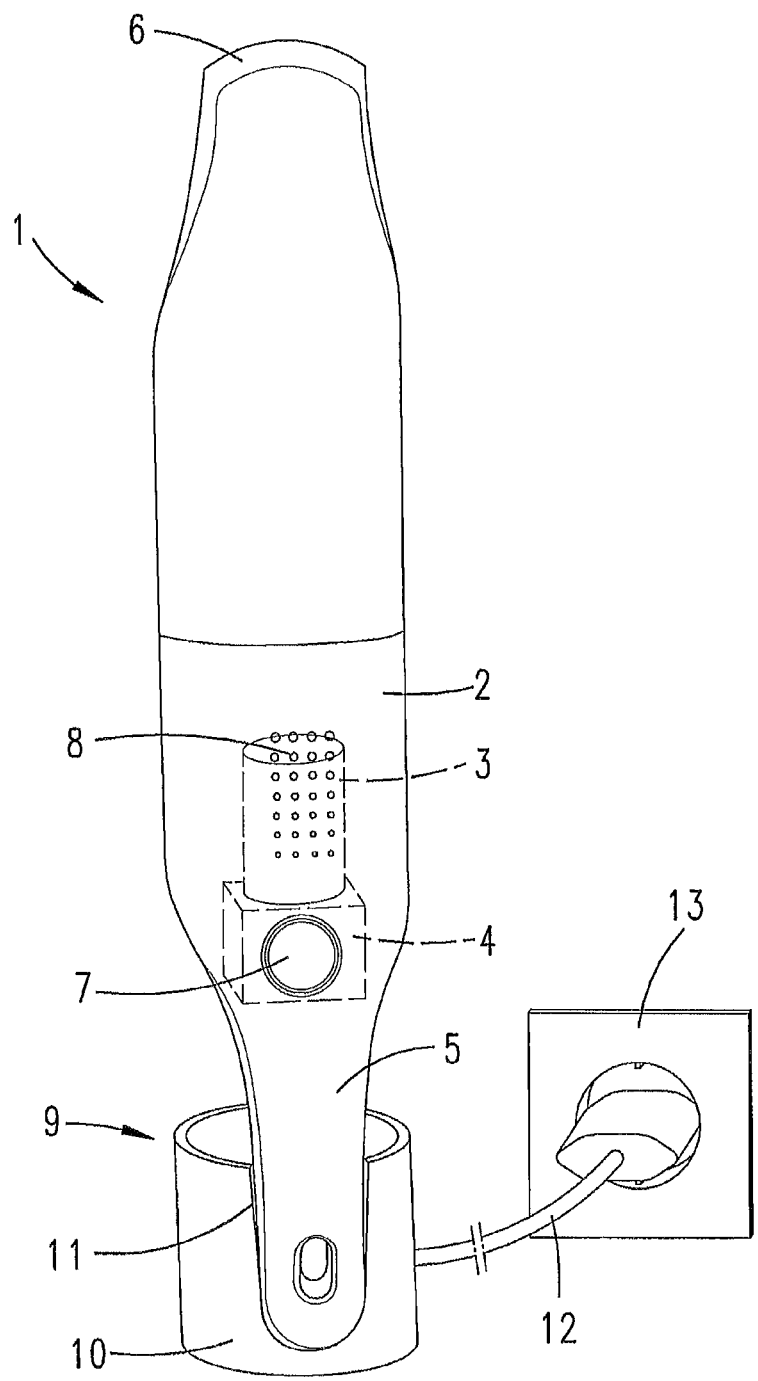

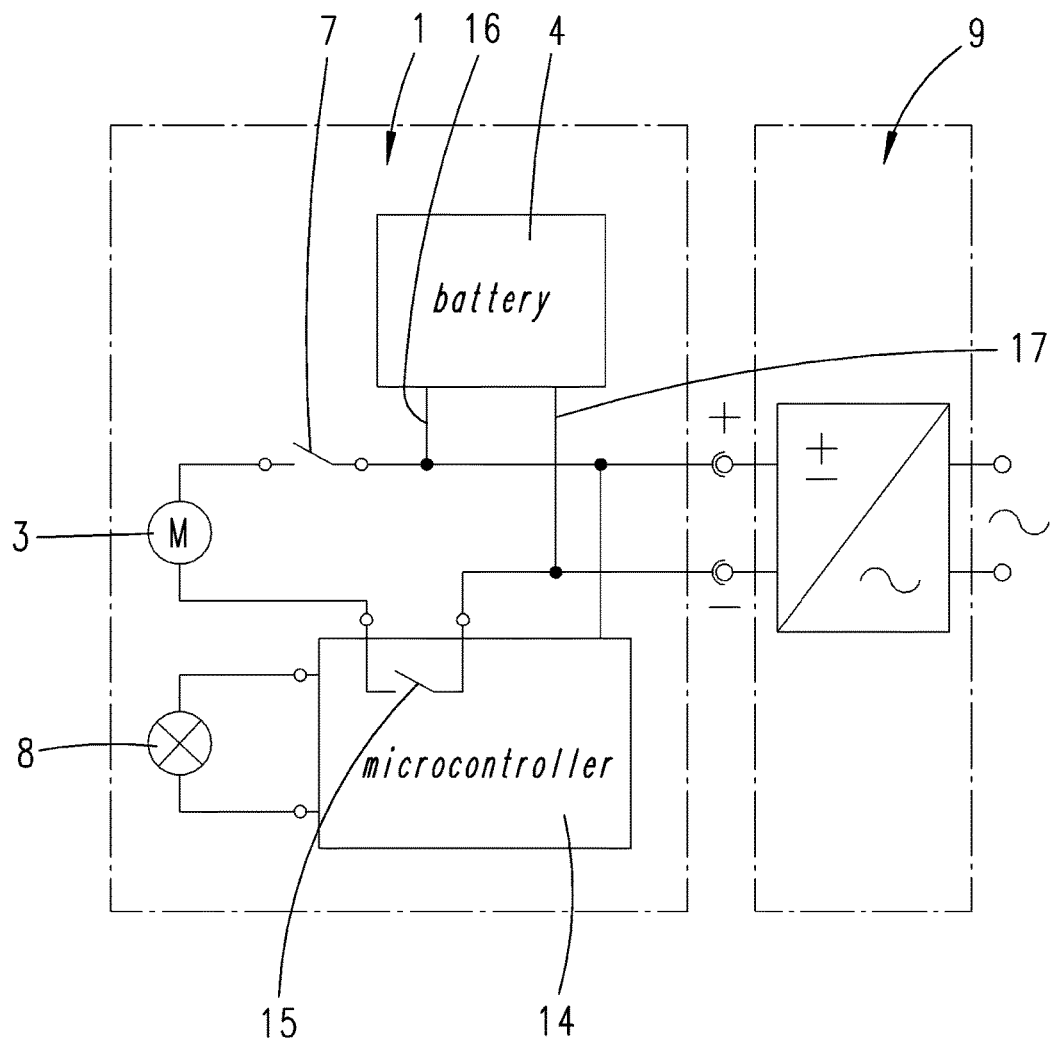

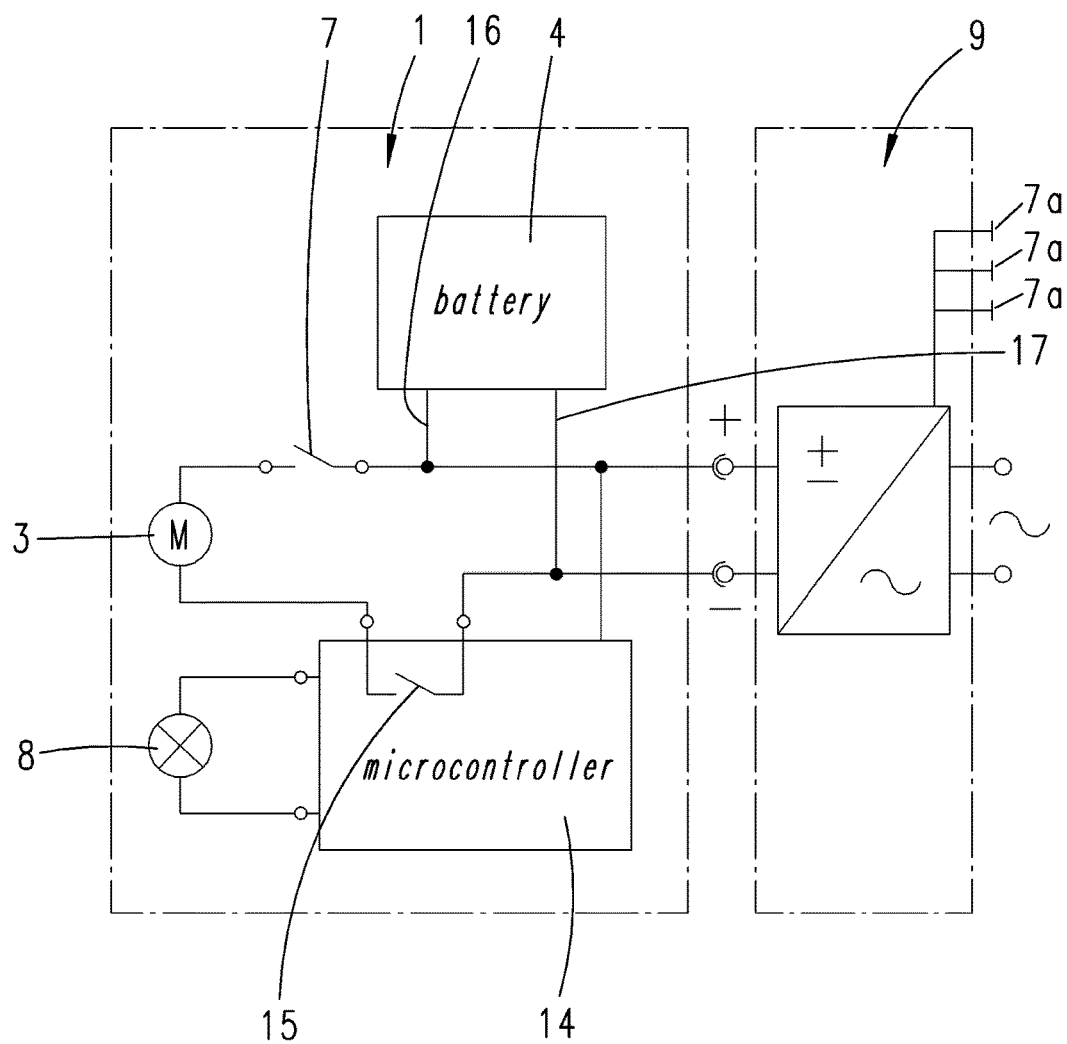

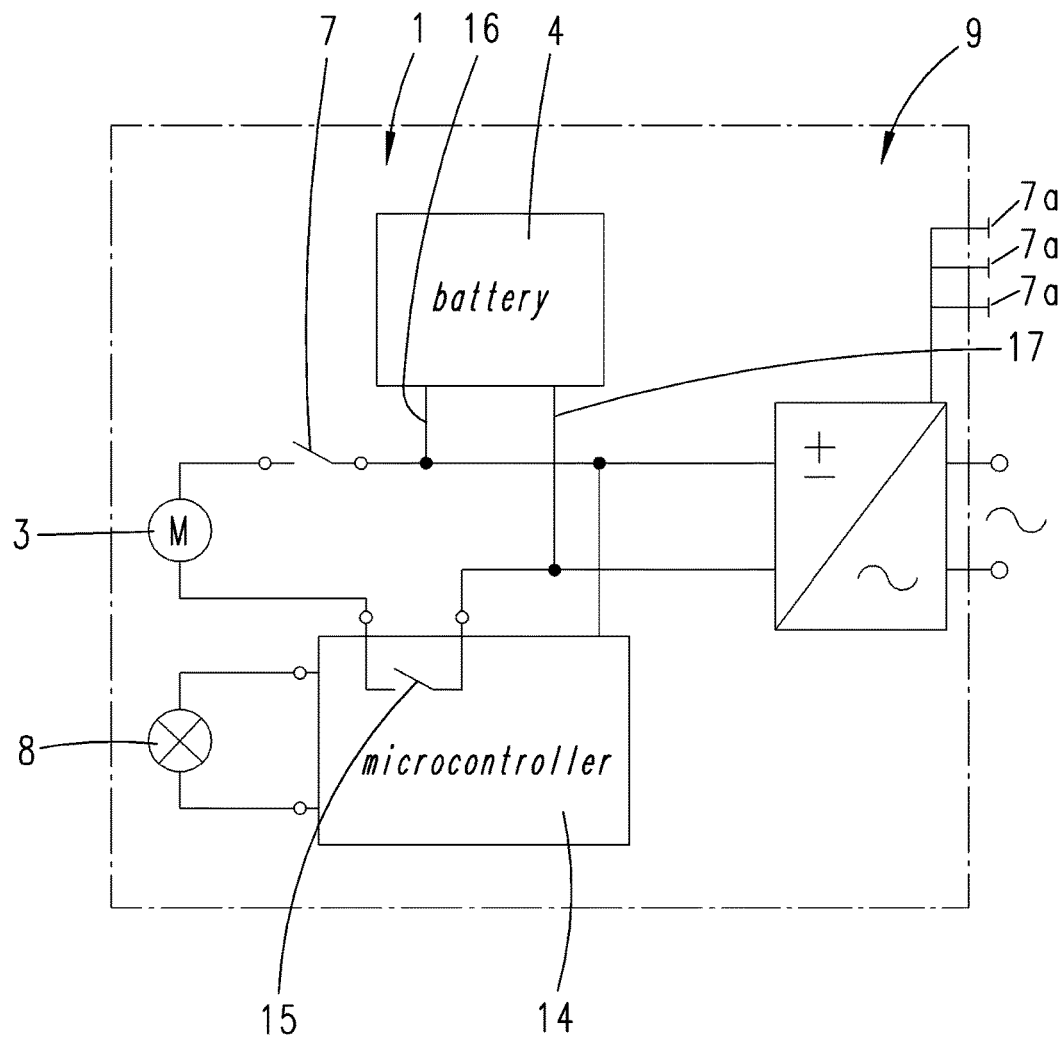

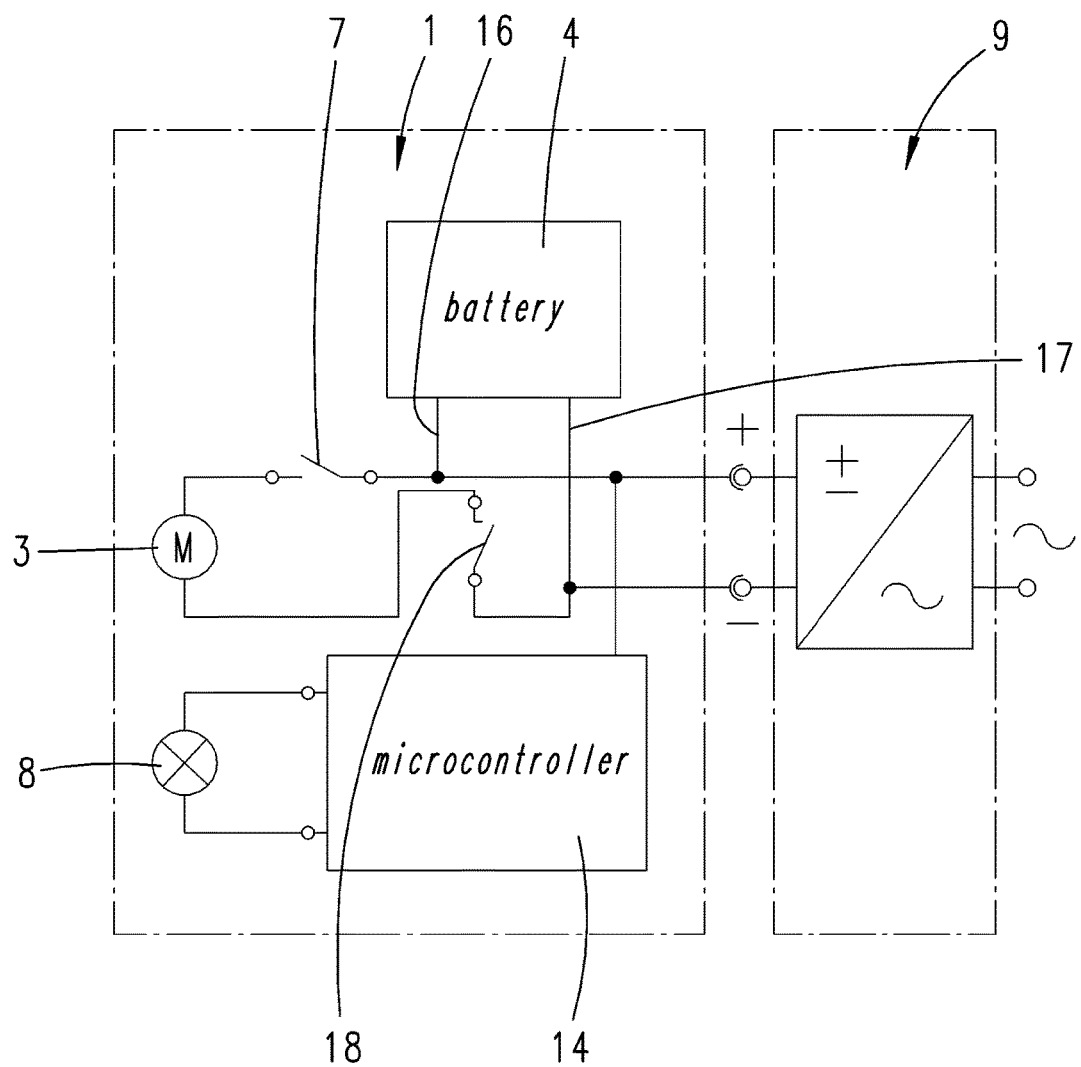

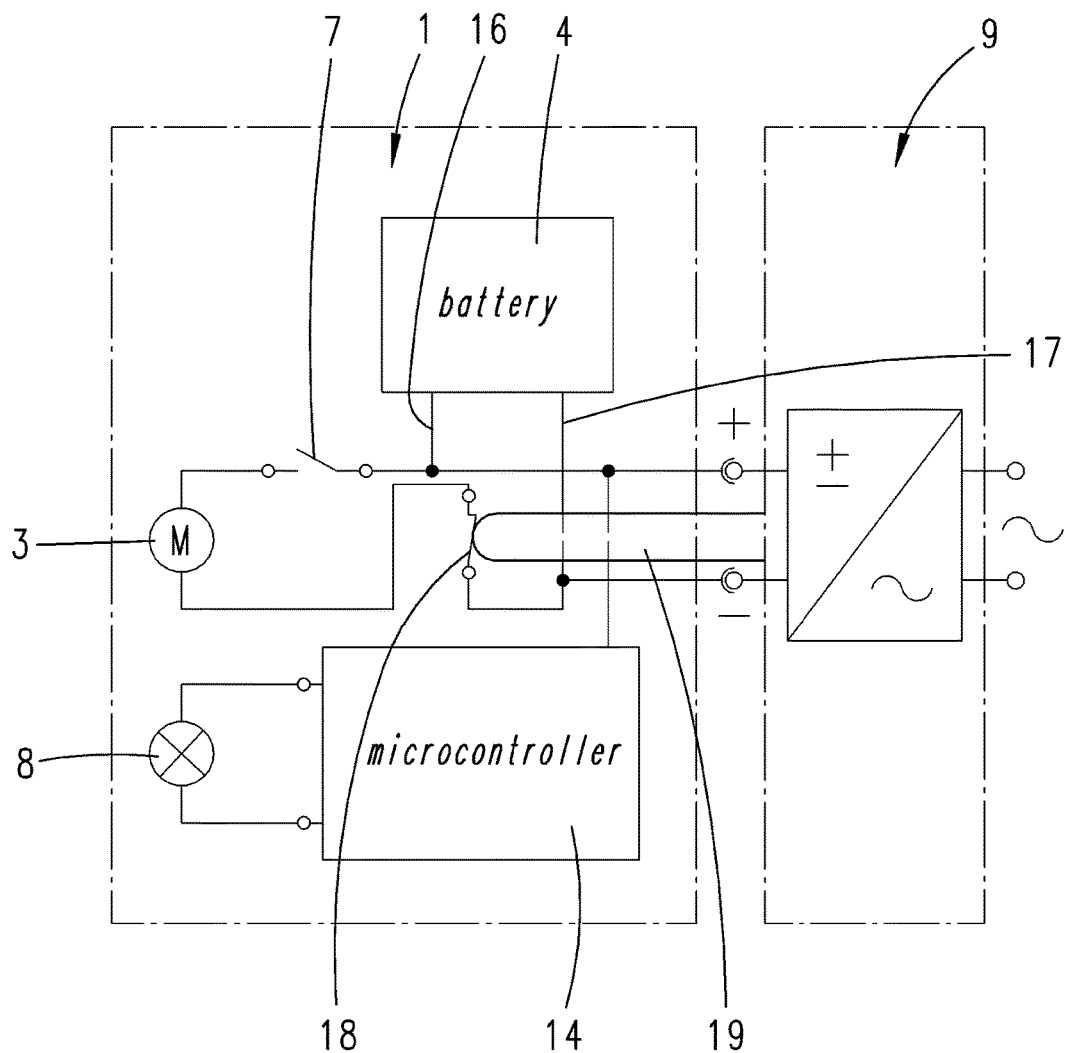

METHOD FOR FORMING A TRANSPORT SAFETY SYSTEM AND BATTERY-OPERATED ELECTRICAL DEVICE

CROSS REFERENCE TO RELATED APPLICATIONS

Applicant claims priority on and this application is a continuation under 35 U.S.C. 120 of International Application No. PCT/EP2013/050631 filed on Jan. 15, 2013, which claims priority under 35 U.S.C. 119 of German Application No. 102012100866.3 filed on Feb. 2, 2012. The International Application under PCT Article 21(2) was not published in English. Applicants also claim priority under 35 U.S.C. 119 of German Application No. 102012100866.3 filed on Feb. 2, 2012. The disclosure of the aforesaid International Application and German application are incorporated by reference.

BACKGROUND OF THE INVENTION

The invention relates first of all to the formation of a transport safety system in an electrical device operated by a battery for preventing discharge of the battery during transport.

The invention further relates to a battery-operated electrical device and a combination of a charging device for a battery-operated electrical device and a battery-operated electrical device.

Electrical devices operated by a battery are known in which the battery can be removed from the electrical device and can be charged by means of a mains power connection, optionally by means of a separate charging station. On the other hand, electrical devices are known in which the battery is continuously connected in the electrical device and can be recharged by means of a mains power connection of the electrical device. In both cases there is the problem that on the one hand it is desired that the user can also use the electrical device immediately after purchase. This requires the battery to be completely charged. On the other hand, however, discharge of the battery can occur by initiation of an electrical contact during transport. In order to prevent the latter, the aforementioned transport safety systems are known. These may on the one hand consist of locking an actuating button on the electrical device by which the device can be activated. The user must first of all deliberately remove the lock. In the simplest case the lock may for example consist of a label adhered to a button. On the other hand, in particular for batteries which can be removed from the electrical device, it is also known to close a connector opening on the battery by a label or an adhesive strip which then also has to be removed at the outset for the first insertion.

On the one hand these known transport safety systems are still not satisfactory from a manufacturing point of view. Errors can occur if for instance the locking means is not inserted or is released prematurely. On the other hand such a transport safety system is not yet perceived as optimal by the user. For example residues may remain when a label is removed. Sometimes it is also not immediately possible to understand what measure is necessary for removal of the transport safety system.

U.S. 2010/0109765 A1 discloses a device which with regard to the battery is put into a state which reduces self-discharge of the battery to the greatest possible extent during transport. It is put into this state by wireless actuation.

A comparable configuration is also known from U.S. 2011/0006736 A1.

It is known from U.S. Pat. No. 6,271,605 B1 that a charged battery is completely separated from the consumer unit.

SUMMARY OF THE INVENTION

Proceeding from the stated prior art, the object of the invention is to provide a favorable configuration with regard to a transport safety system of a battery-operated electrical device. A further object is to provide a combination of a charging device and an electrical device which is advantageous in this connection.

This object is achieved first of all by a transport safety system in which a wanted or unwanted actuation of an activating button of the electrical device does not lead to activation of the electrical components of the device and in which the transport safety system is activated by a button actuation provided on the device.

This object is also achieved in terms of a battery operated electrical device, wherein the transport safety system provides that a wanted or unwanted actuation of an activating button of the electrical device does not lead to activation of the electrical components of the device and that the transport safety system can be activated by a button actuation provided on the charging device.

Finally, the object is also achieved by a combination of charging device and electrical device in which the discharge protection circuit has a mechanical switch which interrupts the voltage supply to the device and in which the charging device has an active part for actuating the switch.

For activation of the transport safety system, an intervention in terms of circuitry takes place, which during conventional handling of the device, namely a conventional (first) charging of the battery, is automatically deactivated, specifically by initiation of the charging operation. A user who acquires such an electrical device with for example a fully charged battery will, at a first attempt to activate the device, recognize that the device cannot be set in operation. He will attribute this to a lack of charging of the battery and will initiate a charging operation in the usual way. Either by insertion of a network cable into the device per se or by removal of the battery and separate charging thereof, in particular in a charging station. However, in this way the transport safety system is deactivated at the same time, so that thereafter the device can be used in the usual way without restriction. If the state of charge of the battery is indicated, for example by a green light, the user can also recognize immediately after the start of a charging operation that the battery is actually charged and the device is ready for operation. The electrical device and the battery do not need to be distinguished in their external properties from a later state of use. The user does not have to carry out any action which he would not also have carried out during use of the device or of the battery. Often the user will also not even be aware that by initiating a charging operation he has deactivated the transport safety system of the battery.

There are also significant advantages in terms of manufacture. The battery-operated electrical device can already be packaged with a properly pre-charged battery. Faulty handling by a user at first charging of the battery can no longer occur. Accordingly a wanted or unwanted actuation of an activating button or switch of the electrical device, for example in the state of packaging of the device, does not lead to activation of the electrical components of the device, for example an electric motor disposed therein. The activating key or switch can also be provided directly on a battery which is then preferably removable.

The first charge of the battery performed by the manufacturer can then preferably be used to activate the transport safety system.

A battery-operated electrical device can be packaged with a pre-charged battery. Accordingly this charging procedure which is provided in any case can be used to activate the transport safety system. Accordingly a wanted or unwanted actuation of an activating button or switch of the electrical device, for example in the state of packaging of the device, does not lead to activation of the electrical components of the device, for example an electric motor disposed therein. In particular at a first use of the electrical device after removal from the packaging and actuation of the activating switch or key, the user will ascertain that the electrical device shows no function and undertakes the obvious step of an attempt to charge the battery provided in the electrical device. As a result the actual cause, namely the transport safety system, is deactivated.

Thus it is preferable that the electrical device and/or a charging device which can be connected to the electrical device or a battery of the electrical device and/or the battery itself has a microcontroller and that the microcontroller deactivates the transport safety system when a charging current is detected. Accordingly the electrical device itself or also alternatively the charging device or the battery has a controller. This monitors inter alia the application of a charging voltage such as is provided during charging of the battery. The controller preferably combines this information purely under software control with any further event which serves for initiation or activation of the transport safety system. If on the other hand the microcontroller detects a charging current with corresponding connection of the electrical device, in particular the battery with the charging device, but not an event which leads to the activation of the transport safety system, then the microcontroller preferably initiates the deactivation of the transport safety system. In this connection, in particular with regard to the activation of the transport safety system in a preferred embodiment, the sequence and duration of the events, in particular the sequence of connection to the charging device and initiation of the further event which can be detected by the microcontroller, is significant.

In one embodiment the transport safety system consists of a switch which interrupts the voltage supply to the electric motor or the electrical consumer unit of the device or output poles of the battery. The switch is preferably a conventional mechanical switch or the like (for example a relay with lock) which is connected in the supply line between the battery and the electrical component to be supplied and which can be activated or deactivated in particular by means of the microcontroller. In this connection an embodiment is preferred in which the switch is formed by an electronic switching element which is more preferably provided inside the microcontroller, but may also be a discrete structural part.

Particularly advantageously the proposed solution is also worthwhile in that the transport safety system can be activated as required, also after a first use by the user, for example with regard to transport of the electrical device with the battery, or separately. In this case the user activates the transport safety system as required in the same way as was in the case of the first activation by the manufacturer, in that the user connects the device or the battery electrically to the charging device and subsequently initiates the further event. Also this selective reactivation of the transport safety system is advantageously controlled by the microcontroller.

With regard to the activation of the transport safety system by a button actuation a separate button can be provided on the device, and actuation of this button offers the further event which can be detected by the microcontroller. In a preferred embodiment the button for activation of the transport safety system is also at the same time the button for activation of the electrical device after deactivation of the transport safety system. In this connection it is further preferred that the button actuation which is necessary for activation of the transport safety system is chosen differently from a conventional button actuation for actuation of the device. Thus in this connection it is preferably provided that the actuation of a button for activating the transport safety system differs, with regard to the actuation duration, from the conventional actuation of a button for switching on the device. Also in this connection the activation of the transport safety system is preferably performed by a combination of actions, for example actuating the button as in morse code.

The proposed invention protects battery-operated devices against inadvertent activation or discharge of the battery during the transport of the device, wherein in this connection a transport safety system is provided without additional aids which for example have to be removed and disposed of by the user. This is preferably activated by means of one and the same button of the device which is also required for operation of the electrical device. The transport safety system is automatically deactivated by the user, without the user having to carry out an action which he does not intuitively understand or which is not obvious to him. The transport safety system can be activated by a combination of the presence of the charging device and a pressure on the operating button preferably lasting a relatively long time, preferably several seconds. In this case, the charging device must be connected to the device and preferably to the household power supply system. The device subsequently goes automatically into charging mode and thus recognizes this state. In the charging mode, the activation of the device function (discharging of the battery) is prevented, wherein the device more preferably signals for example by short flashing of a light means that it is not ready for operation. If the button now is still held in spite of the signal, a further optical or also acoustic signal optionally signals that the transport safety system has been applied. After removal of the charging device the device shows no reaction to any pressure on the button. The transport protection deactivates automatically at the next connection to the charging device and can be reactivated as often as required.

As an alternative to prolonged pressure on the button for activation of the transport safety system, another sequence for operating the button can also be selected. In this case the events "depress" and "release" take place preferably in a specific time window. The sequence can preferably be extended to a plurality of consecutive events with a plurality of time windows, which makes it unlikely that the user will press these in this chronological sequence during the connection of the device to the charging device.

In a further preferred embodiment the events "depress" and "release" are required by a randomly controlled succession of flashing sequences to which the user must react in a specific time window. In this case the pattern signaled randomly by a flashing pattern must be performed by the user by actuation of the button in the same succession in a specific time window.

A battery-operated electrical device is preferably already packaged with a pre-charged battery, wherein in the charging procedure which is provided in any case the transport safety system is preferably already activated. Accordingly a wanted or unwanted actuation of an activating element, for example a button or switch of the electrical device, for example in the state of packaging of the device, does not lead to activation of the electrical components of the device. In particular at a first use of the electrical device after removal from the packaging and actuation of the switch or button which for example activates an electric motor, the user will ascertain that the electrical device shows no function. Then the user undertakes the obvious step of attempting to charge the battery on the charging device, wherein the actual cause, namely the transport safety system, is deactivated.

It is further preferred that the discharge protection circuit has a mechanical switch which interrupts the voltage supply to the device and that the charging device has an active part for actuating the switch. This is preferably a separate switch, more preferably a switch which is not accessible from the exterior in particular by the user, and correspondingly is more preferably not a switch for conventional activation of the electrical device. Accordingly for activation of the electrical device, and in particular for use thereof, at least two switches should be moved into an electrical closed position, namely on the one hand the conventional activation switch which can be actuated by the user, and also the switch, preferably inside the device, which in the transport safety setting interrupts the voltage supply of the device, in particular of the electric motor or the like present in the device. With association of the electrical device to the charging device this interrupter switch is preferably automatically moved into the transport safety system deactivation position, i.e. more preferably into a closed position thereof. In this connection the charging device has an active part, in particular a part which in the position associating the electrical device to the charging device engages in the electrical device and acts on the switch. The active part is preferably a part which is exposed to the electrical device opposite a contact surface of the charging device, more preferably a part of the charging device on the housing side, for example a rod-shaped part, which extends through a correspondingly provided opening in the electrical device into the interior for actuation of the relevant switch. With association of the electrical equipment to the charging device, the transport safety system is deactivated automatically and more preferably without further action by the user, wherein this switch position is automatically maintained.

In a further embodiment the transport safety system can preferably be selectively activated, also for example as a result of an influencing element which acts on the transport safety system switch and can be actuated by the user. Such an influencing element, for example in the form of a slide or pressure element, is in this case merely designed for activation of the transport safety system, corresponding to the opening of the switch, but not for influencing the switch in the transport safety system. Also the transport safety system can be activated as a result of corresponding actions on the charging device.

BRIEF DESCRIPTION OF THE DRAWINGS

The invention is explained in greater detail below with reference to the appended drawings which only illustrate exemplary embodiments. A part which is explained only on the basis of one of the embodiments, and in a further embodiment is not replaced by another part because of the special detail shown there, is therefore also described for this embodiment as a part which may be present in any case. In the drawing:

FIG. 1 shows a perspective view of an electrical device in the form of a battery-operated hand-held vacuum cleaner as well as a charging device for the electrical device;

FIG. 2 shows the electrical device in the position associated with the charging device for charging the battery at the device;

FIG. 3 shows a schematic circuit diagram of a circuit arrangement for activation and deactivation of a transport safety system of the device;

FIG. 4 shows a view corresponding to FIG. 3 relating to another embodiment in the transport safety system; and FIG. 5 shows a view corresponding to FIG. 4 during deactivation of the transport safety system.

DETAILED DESCRIPTION OF THE EMBODIMENTS

First of all with reference to FIG. 1 an electrical device 1 in the form of a hand-held, battery-operated vacuum cleaner is illustrated and described, in particular for vacuum cleaning of surfaces above floor level, such as for example table tops or work surfaces.

To this end the electrical device 1 has an electric motor 3 which is accommodated in a housing 2 and which in the illustrated embodiment is in particular as an electrical vacuum fan motor. The electrically supply of the electric motor 3 is achieved by a battery 4 which is likewise disposed in the housing 2 and can preferably be removed at least without tools from the housing 2.

Furthermore, although not illustrated, a dust collecting chamber or a dust filter bag is disposed in the housing 2 for filtering out dust and dirt particles from the suction air flow produced by the vacuum fan motor and conveyed further through a suction channel passing through the housing 2, said air flow flowing in through a suction mouth 6 opposite a stem-like handle region 5. For activation of the electrical device 1 a button 7 is provided in the region of the handle 5.

Furthermore a light display 8 which is provided in the housing wall and which during operation of the device is in the user's field of view, this light display serving in particular for optical signaling of the proper state of charge of the battery 4 and/or as an indication of readiness for operation.

For charging of the battery 4 a charging device 9 is also provided. This includes in preferred and usual manner at least one transformer for converting a mains voltage into a rectified voltage.

The housing 10 of the charging device 9 is provided with a recess 11 adapted to the cross-sectional contour of the handle region 5 of the electrical device 1, in particular for accommodation of the handle region 5 by positive engagement in the charging position.

Electrical contacts not shown in greater detail are positioned in the region of the recess 11 for co-operation with corresponding matching contacts in the region of the handle 5 which are guided to the battery 4.

The power supply to the charging device 9 takes place by means of a mains power cable 12 for connecting the charging device 9 to a power socket 13, in particular of the household power supply system.

A transport safety system is provided, in particular for the battery 4 installed in the electrical device 1. This transport safety system can be activated and deactivated in the associated position of the electrical device 1, in particular of the battery 4 to the charging device 9.

In this connection the electrical device 1 also has a microcontroller 14 installed in the device. This microcontroller monitors inter alia in the loading position of the electrical device 1 according to FIG. 2 and the application of a charging voltage for charging the battery 4 at the device. This information item or this state of charge is combined by the microcontroller, preferably purely under software control, with a further event, preferably the pressing of the button 7 over a relatively long, preferably predetermined time period. This actuation of a button preferably takes place by means of the button 7 on the device which is also used for the usual operation of the electrical device 1.

For activation of the transport safety system the electrical device 1, and also in particular the battery 4 is brought into the charging operation position on the charging device 9, in particular following insertion or adjustment of the handle region 5 of the electrical device 1 in the region of the recess 11 on the charging device, said charging device 9 in turn preferably being connected to the household power supply system. In this charging mode the activation of the device function of the electrical device 1 and thus the discharging of the battery 4 is preferably prevented. In this case the electrical device 1 preferably signals by flashing of the light indicator 8 that it is not ready for operation. For activation of the transport safety system, in this positioning the button 7 is preferably pressed and held for a period of several seconds, more preferably 5 seconds. Over the preferably predetermined time period this actuation is detected by the microcontroller 14, which results in the opening of a switch 15 which interrupts the voltage supply to the electric motor 3 of the device 1. The voltage supply to the electric motor 3 takes place by means of a discharge protection circuit of the battery or as in the embodiment of the electrical device 1. The discharge protection circuit consists in the simplest manner of two lines 16, 17, which are supplied with power by means of the battery and serve immediately for application of the voltage, optionally by means of output poles of the battery, on the electric motor M. The line 17 is formed with the switch 15 and so can be interrupted in order to achieve the transport safety. This switch 15 is preferably an electronic component which is integrated in in the microcontroller 14. The activated transport safety system is then preferably indicated by a signal of the light display 8.

The switch 15 remains in its open position until the transport safety system is deactivated again. In the activated position of the transport safety system after the removal from the charging device 9 the electrical device 1 shows no reaction to any button press or to any length of button press.

A deactivation of the transport safety system takes place automatically at the next connection of the electrical device 1, in particular the battery 4, to the charging device 9, wherein from the activated transport safety setting with a reconnection to the charging device 9 the microcontroller 14 closes the switch 15, following which accordingly after removal of the charging device 9 the electrical device 1 can be set in operation by actuating of the button 7.

The activation of the transport safety system can preferably be effected again at any time by the user, by connecting the electrical device 1, in particular the battery 4, to the charging device 9 and in this position performing the predetermined combination of buttons or pressuring the button 7 over a predetermined period of time.

Accordingly the transport safety system is activated when the charging device 9 is connected to the battery 4, the button 7 is preferably pressed for longer than 5 seconds and then the charging device 9 is removed again. This is not an event which can be caused inadvertently. Accordingly the transport safety system can only be activated deliberately.

For deactivation of the transport safety system the battery 4 of the electrical device 1 is again connected to the charging device supplied with power by means of the household mains network, which is not possible during transport of the electrical device 1 but is usual in the daily use of the electrical device 1.

FIGS. 4 and 5 show a further embodiment, in which the transport safety system can be deactivated mechanically.

Here a mechanical switch is incorporated in the line 17 of the discharge protection circuit. This is preset in an open position according to the representation in FIG. 4, in which open position of the switch 18 a (first) charging of the battery 4 by means of the charging device 9 can be achieved. The charging device 9, in particular for first charging of the battery 4, is preferably a charging device designed solely for these purposes.

The charging device which can be associated with the electrical device 1 according to the representation in FIG. 5, corresponding to the charging device 9, with which the electrical device 1 can be associated after a first charging, has an active part 19. This is a pin-like part, which preferably extends freely from the charging device housing or a supporting or contact surface for the electrical device, for passage through a housing opening (not shown) in the electrical device.

With proper application of the electrical device 1 to the charging device 9 according to the representation in FIG. 5, the active part 19 acts on the switch 18, so that it is moved into an electrically closed position. In this case the switch 18 is designed so that this closed position is automatically maintained, even after removal of the electrical device 1 from the charging device 9.

Accordingly with application of the electrical device 1 to the charging device 9 automatic deactivation of the transport safety system is achieved, by mechanical movement of the switch 18 into the closed position.

LIST OF REFERENCE SIGNS 1 electrical device
2 housing
3 electric motor
4 battery
5 handle region
6 suction mouth
7 button
8 light indicator
9 charging device
10 housing
11 recess
12 mains cable
13 power socket
14 microcontroller
15 shifter
16 line
17 line
18 switch
19 active part
M electric motor

What is claimed is:

1. A method for forming a transport safety system in an electrical device operated by a battery, for preventing discharge of the battery that occurs by initiation of an electrical contact during transport, wherein the electrical device has a button to activate the device, comprising the following steps:
- providing an electrical discharge protection circuit for the battery or the electrical device,
- activating the discharge protection circuit by pressing the button provided on the device in a first action while the battery is connected to a charging device,
- deactivating the discharge protection circuit only by charging the battery, wherein a wanted or unwanted actuation of the button when the discharge protection circuit is activated does not lead to activation of electrical components of the device, and
- indicating a full charge of the battery after start of a charging operation such that the device is ready for operation,
- wherein activation of the electrical device after deactivation of the electrical discharge protection circuit is accomplished by pressing the button on the device in a second action that is different from the first action, and wherein an actuation duration of the button within the second action differs from an actuation duration of the button within the first action.

2. An electrical device having a transport safety system, comprising:
- a battery connected to the electrical device,
- a charging device configured to be connected to the electrical device or to the battery, and
- an electrical discharge protection circuit associated with the battery or the electrical device to prevent discharge of the battery that occurs by initiation of an electrical contact during transport,
- an indicator indicating that the battery is charged and that the electrical device is ready for operation, and
- a button on the charging device,
- wherein the electrical discharge protection circuit is adapted to be activated when connected to the charging device by engaging the button on the charging device in a first action while the battery is connected to the charging device, and is adapted to be deactivated only by charging the battery,
- wherein the discharge protection circuit is configured so that a wanted or unwanted actuation of the button when the discharge protection circuit is activated does not lead to activation of electrical components of the electrical device,
- wherein activation of the electrical device after deactivation of the electrical discharge protection circuit is accomplished by engaging the button on the charging device in a second action that is different from the first action, wherein an actuation duration of the button within the second action differs from an actuation duration of the button within the first action, and
- wherein the electrical device has an electric motor and wherein the discharge protection circuit comprises a switch which interrupts the voltage supply to the electric motor of the device.

3. The electrical device according to claim 2, wherein the electrical device or the charging device has a microcontroller that deactivates the discharge protection circuit when a charging current is detected.

4. The electrical device according to claim 2, wherein the discharge protection circuit is adapted to be selectively activated.

5. An electrical device having a transport safety system, comprising:
- a battery connected to the electrical device,
- a charging device for charging the battery of the electrical device, and
- an electrical discharge protection circuit associated with the electrical device or the battery to prevent discharge of the battery that occurs by initiation of an electrical contact during transport,
- wherein the discharge protection circuit is activated by a mechanical switch which interrupts a voltage supply to the electrical device while the battery is connected to the charging device,
- wherein the charging device has a button configured for actuating the switch in a first action, and
- wherein the electrical discharge protection circuit is adapted to be deactivated only by charging the battery, and further comprising an indicator indicating that the battery is charged and the electrical device is ready for operation,
- and wherein activation of the electrical device after deactivation of the electrical discharge protection circuit is accomplished by engaging the button on the charging device in a second action that is different from the first action, wherein an actuation duration of the button within the second action differs from an actuation duration of the button within the first action.

6. The combination according to claim 5, wherein the electrical discharge protection circuit is adapted to be selectively activated.

* * * * *